(12) United States Patent
Ohno (10) Patent No.: US 6,386,581 B1
(45) Date of Patent: May 14, 2002

(54) CONTROLLING DEPLOYMENT OF AIR-BAG BODY OF HEAD-PROTECTION AIR-BAG DEVICE

(75) Inventor: Mitsuyoshi Ohno, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/734,736

(22) Filed: Dec. 13, 2000

(30) Foreign Application Priority Data

Dec. 13, 1999 (JP) .......................................... 11-353528

(51) Int. Cl.[7] .............................................. B60R 21/32
(52) U.S. Cl. .................... 280/735; 280/730.2; 280/737; 701/45; 180/282
(58) Field of Search .............................. 280/735, 737, 280/730.2; 701/45; 180/282

(56) References Cited

U.S. PATENT DOCUMENTS

| | | | | |
|---|---|---|---|---|
| 3,853,331 A | * | 12/1974 | Jones ........................... 28/735 |
| 3,868,126 A | * | 2/1975 | Radke et al. ................ 280/735 |
| 5,602,734 A | * | 2/1997 | Kithil .......................... 280/735 |
| 5,709,406 A | * | 1/1998 | Buchanan ................... 280/737 |
| 5,788,270 A | | 8/1998 | Haland et al. |
| 5,794,973 A | * | 8/1998 | O'Loughlin et al. ........ 280/737 |
| 5,880,534 A | * | 3/1999 | Mossi et al. ................ 280/735 |
| 5,925,084 A | | 7/1999 | Gotoh et al. |
| 5,967,550 A | * | 10/1999 | Shirk et al. ................. 280/736 |
| 6,104,284 A | | 8/2000 | Otsuka |
| 6,186,539 B1 | * | 2/2001 | Foo et al. .................... 280/735 |
| 6,198,997 B1 | * | 3/2001 | Ishikawa et al. .............. 701/45 |
| 6,209,909 B1 | * | 4/2001 | Breed ......................... 280/735 |
| 6,209,910 B1 | * | 4/2001 | Nagae ........................ 280/735 |
| 6,212,455 B1 | * | 4/2001 | Weaver ........................ 701/45 |
| 6,237,950 B1 | * | 5/2001 | Cook et al. ................. 280/736 |
| 6,260,878 B1 | * | 7/2001 | Tanase .................... 280/730.2 |
| 6,289,820 B1 | * | 9/2001 | Anacker et al. ............ 280/737 |
| 6,301,536 B1 | * | 10/2001 | Vaessen et al. ............... 701/45 |

FOREIGN PATENT DOCUMENTS

| | | |
|---|---|---|
| EP | 0 873 918 A2 | * 10/1998 |
| JP | 10109611 A | * 4/1998 |
| JP | 10-297423 | 11/1998 |

* cited by examiner

Primary Examiner—Lanna Mai
Assistant Examiner—Ruth Ilan
(74) Attorney, Agent, or Firm—Pillsbury Winthrop

(57) ABSTRACT

A method and apparatus for controlling deployment of an air-bag body of a head-protection air-bag device, in which the internal-pressure retention time can be increased in the case of the rollover of a vehicle without increasing the bulk of the air-bag body in the non-operational state. When rollover of a vehicle is detected by a rollover sensor, only a squib is actuated by the output of a control circuit. As a result, a firing pin pierces through a burst disk, so that a compressed gas that is not heated and pressurized by a gas-heating agent flows through a small-diameter portion and a diffuser into an air-bag body. Accordingly, in the case of the rollover, an internal pressure of the air-bag body has a lower peak value and reaches the peak value for a longer time compared with the side collision case.

24 Claims, 10 Drawing Sheets

CONTROLLING DEPLOYMENT OF AIR-BAG BODY OF HEAD-PROTECTION AIR-BAG DEVICE

INCORPORATION BY REFERENCE

The disclosure of Japanese Patent Application No. 11-353528 filed on Dec. 13, 1999 including the specification, drawings and abstract is incorporated herein by reference in its entirety.

BACKGROUND OF THE INVENTION

1. Field of the Invention

The invention relates to controlling deployment of an air-bag body of a head-protection air-bag device. More particularly, the invention relates to controlling deployment of an air-bag body of a head-protection air-bag device including a side-impact sensor and a rollover sensor in which the air-bag body is deployed and inflated like a curtain along the side of the vehicle compartment.

2. Description of Related Art

In order to improve the capability of protecting the head of an occupant seated in the front seat against a predetermined high load applied to the side of the vehicle body, there has been proposed a head-protection air-bag device having an air-bag body stored in a folded state along the roof side rail. In this head-protection air-bag device, the air-bag body inflates like a curtain along the side window glass. Hereinafter, the structure of the aforementioned head-protection air-bag device disclosed in U.S. Pat. No. 5,788,270 will be described.

Figure 10:
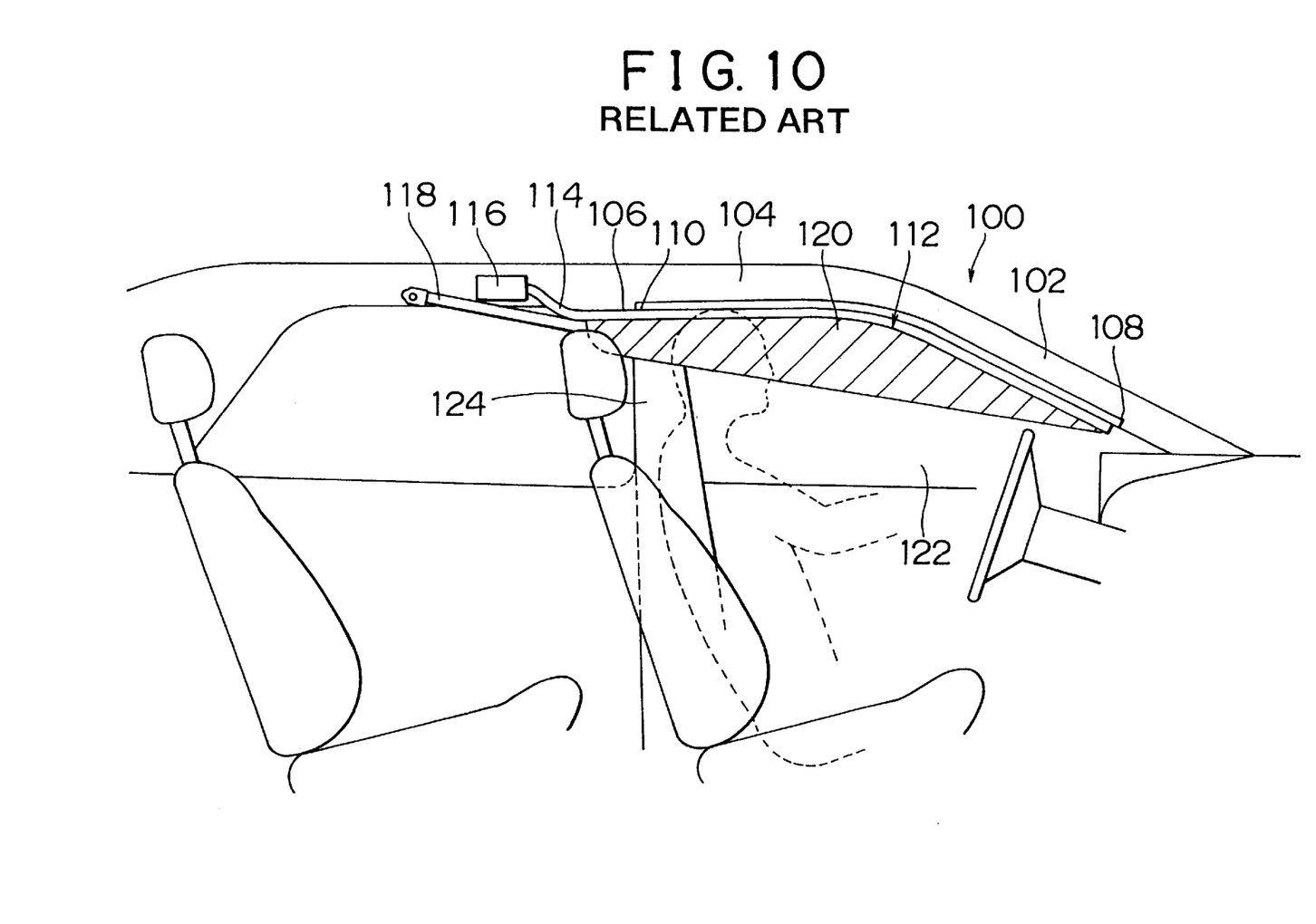
FIG. 10 is a schematic side view showing the state where deployment of an air-bag body of a head-protection air-bag device is completed.

As shown in FIG. 10, this head-protection air-bag device 100 is mainly composed of an elongate duct 106 extending from a front pillar portion 102 along a roof side rail portion 104, an air-bag body 112 stored in the folded state within the duct 106 and fixed to the vehicle body at a front-end fixing point 108 and a rear-end fixing point 110, an inflator 116 connected to the rear end of the duct 106 through a hose 114, for injecting a gas in response to a predetermined high load applied to the side of the vehicle body, and a band-shaped strap 118 having its one end fixed to the vehicle body and the other end fixed to the rear end of the air-bag body 112. The air-bag body 112 is formed by a plurality of substantially cylindrical cells 120 connected to each other with their longitudinal axes being oriented approximately in the vertical direction of the vehicle.

The aforementioned structure causes the gas to be injected from the inflator 116 when the predetermined high load is applied to the side of the vehicle body. The injected gas flows in each cell 120 of the folded air-bag body 112 through the hose 114 and the duct 106. As a result, each cell 120 inflates into a substantially cylindrical shape along the longitudinal axis of the vehicle. Thus, the air-bag body 112 inflates like a curtain along a window glass 122. Moreover, the rear end of the air-bag body 112 is connected to the vehicle body through the strap 118 so as to be reliably located inside the top portion of a B-pillar (i.e., a center pillar) portion 124.

However, in such a head-protection air-bag device, the air-bag body 112 must be instantaneously deployed and inflated upon lateral collision (side collision) of the vehicle. Therefore, in the early stage of the deployment, the air-bag body 112 is subjected to a high gas-pressure as well as the inflation force of the air-bag body itself. Accordingly, the air-bag body 112 may be damaged to cause gas leakage, and an internal-pressure retention time may be reduced. As a result, in case of rollover of the vehicle that requires a long internal-pressure retention time, the thickness of a sealant applied to the surface of the air-bag body and the weaving density of the bag must be increased in order to prevent the damage to the air-bag body. However, this results in a bulky air-bag body in the folded state, thus requiring a larger storage space.

Therefore, a need exists for controlling deployment of an air-bag body of a head-protection airbag device, in which the internal-pressure retention time can be increased in the case of rollover without increasing the bulk of the airbag body in the folded state.

SUMMARY OF THE INVENTION

The present invention controls deployment of an air-bag body of a head-protection air-bag device, in which the internal-pressure retention time can be increased in the case of the rollover without increasing the bulk of the air-bag body in the folded state.

In a method for controlling deployment of an air-bag body of a head-protection air-bag device provided with a side-impact sensor and a rollover sensor according to a first aspect of the invention, the air-bag body is deployed and inflated like a curtain along a side of a vehicle compartment by a gas injected from an inflator that is actuated in response to a detection signal output from the respective sensors. The method includes the steps of injecting high pressure gas from the inflator when the side-impact sensor detects side collision, and injecting low pressure gas from the inflator when the rollover sensor detects rollover.

Accordingly, when the side-impact sensor detects side collision, the inflator is actuated such that the high pressure injected gas flows into the air-bag body. As a result, the air-bag body is instantaneously deployed and inflated to protect the head of the occupant. When the rollover sensor detects rollover of the vehicle, the inflator is actuated such that the low pressure injected gas flows into the air-bag body. As a result, in the case of the rollover, the damage to the air-bag body due to the gas pressure can be reduced, and therefore, gas leakage resulting from the damage can be reduced. This may increase the internal-pressure retention time, whereby movement of the air-bag body toward the outside of the vehicle while constraining the occupant (in the deployed state) can be regulated for a longer time. Moreover, it is no longer necessary to increase the thickness of the sealant applied to the surface of the air-bag body and the weaving density of the bag in case of the rollover. Therefore, the bulk of the air-bag body in the folded state is not increased, and a large storage space, thus, is not necessary. Moreover, in the case of the rollover, the air-bag body is deployed at a low expansion pressure. Therefore, the damage to the interior parts such as garnish and assist grip can be reduced, allowing reduction in the repair cost.

In a method for controlling deployment of an air-bag body of a head-protection air-bag device provided with a side-impact sensor and a rollover sensor according to the second aspect of the invention, the air-bag body is deployed and inflated like a curtain along a side of a vehicle compartment by a gas injected from an inflator that is actuated in response to a detection signal output from the respective sensors. The method includes the steps of reducing a time for an internal pressure of the air-bag body to reach a peak value by the injected gas from the inflator when the side-impact sensor detects side collision; and increasing a time for an internal pressure of the air-bag body to reach a peak value by the injected gas from the inflator when the rollover sensor detects rollover.

Accordingly, when the side-impact sensor detects side collision, the inflator is actuated, and the internal pressure of the air-bag body quickly reaches the peak value. As a result, the air-bag body is instantaneously deployed and inflated, protecting the head of the occupant. When the rollover sensor detects rollover of the vehicle, the inflator is actuated, and the internal pressure of the air-bag body reaches the peak value, taking a longer time than that taken by the side collision case. As a result, in the case of the rollover, the damage to the air-bag body due to the rapid increase in the internal pressure can be reduced, and therefore, gas leakage resulting from the damage can be reduced. Accordingly, the internal-pressure retention time is increased, whereby the movement of the air-bag body toward the outside of the vehicle while constraining the occupant (in the deployed state) can be regulated for a longer time. Moreover, it is no longer necessary to increase the thickness of the sealant applied to the surface of the air-bag body and the weaving density of the bag, in case of the rollover. Therefore, bulk of the air-bag body in the folded state is not increased, and a large storage space, thus, is not necessary. Moreover, in the case of the rollover, the expansion pressure upon deployment of the air-bag body rises at a relatively lower speed. Therefore, the damage to the interior parts such as garnish and assist grip can be reduced, allowing reduction in the repair cost.

Note that each of the above-mentioned aspects is also applicable to a vehicle provided with an air-bag body having such a shape that protects the heads of the occupants in the front and rear seats, and a vehicle provided with an airbag body having such a shape that protects the heads of the occupants in the front seat, second-row seat, and third-row seat of the vehicle.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Hereinafter, a method for controlling deployment of an air-bag body of a head-protection air-bag device according to a first embodiment of the invention will be described referring to FIGS. 1 to 4.

Figure 1:
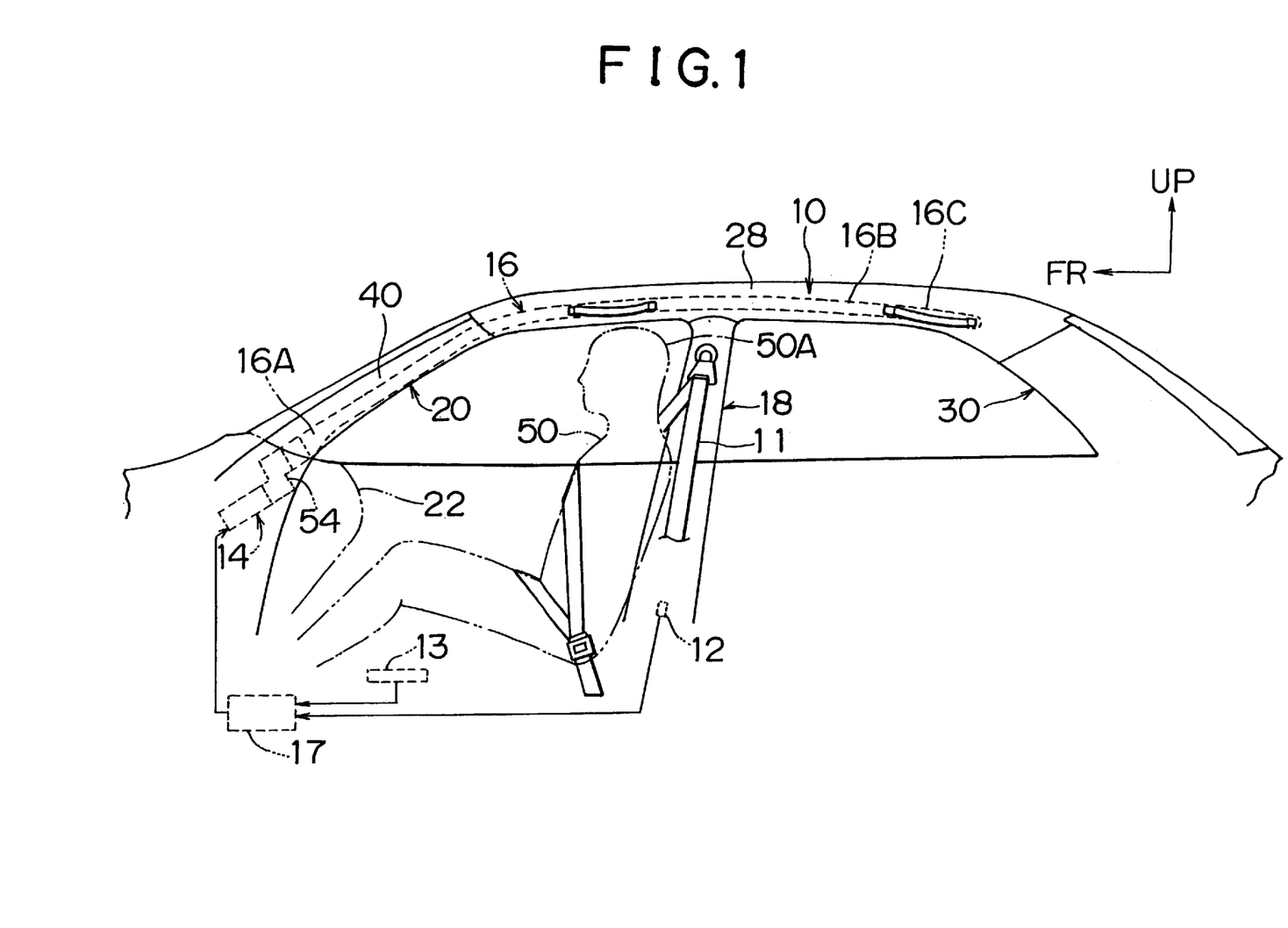
FIG. 1 is a schematic side view showing the state where the air-bag body is stored in the method for controlling deployment of the air-bag body of the head-protection air-bag device according to the first embodiment of the invention.
Figure 2:
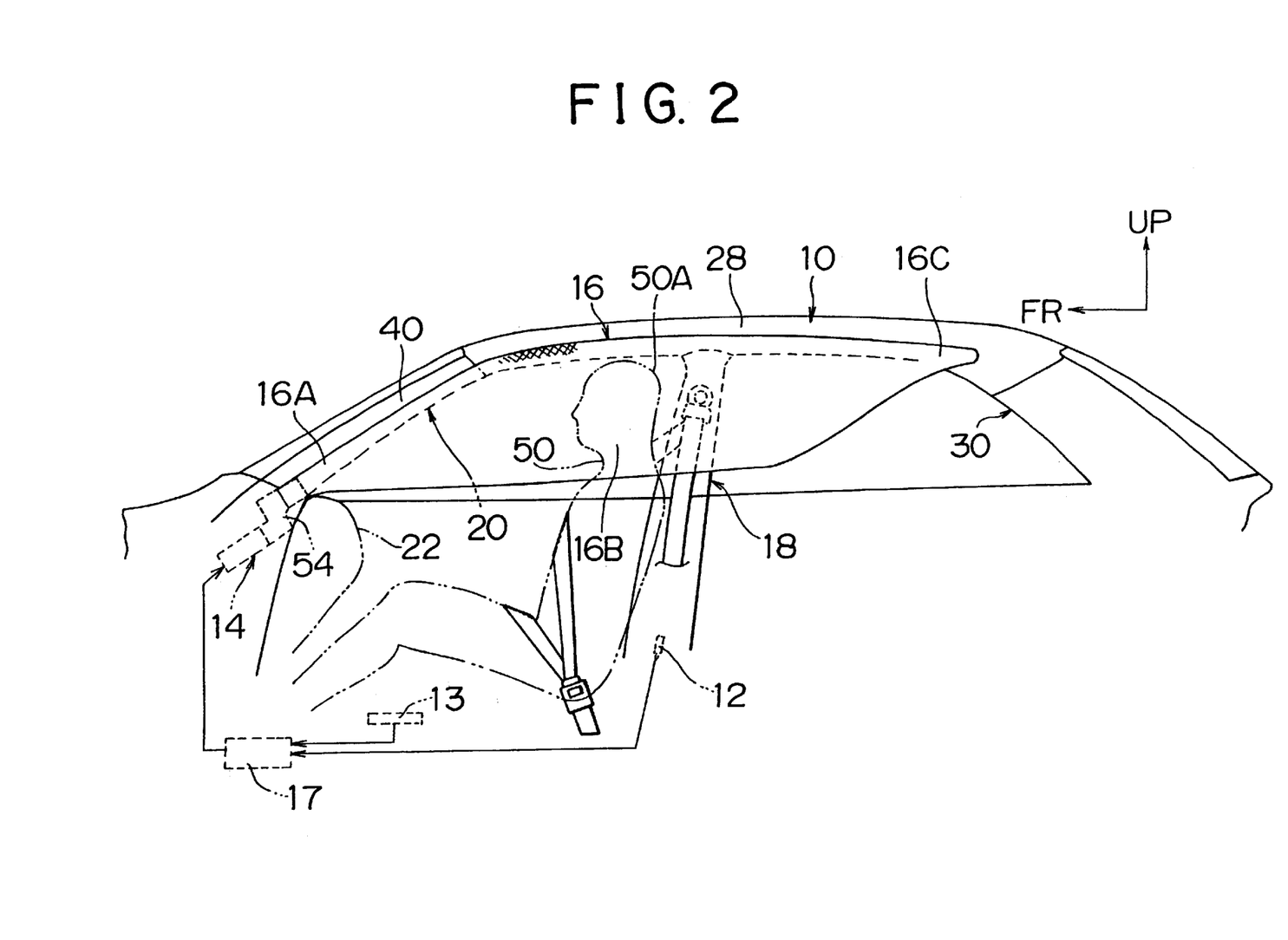
FIG. 2 is a schematic side view showing the state where the air-bag body is deployed in the method for controlling deployment of the air-bag body of the head-protection air-bag device according to the first embodiment of the inventions

As shown in FIG. 1, a head-protection air-bag device 10 of this embodiment is mainly composed of a side-impact sensor 12 for detecting a side-collision state, a multi-stage-output inflator 14 for injecting a gas upon actuation, a head-protecting air-bag body 16 folded in a predetermined folding manner, and a control circuit 17 serving as control means for controlling actuation of the inflator 14. The head-protection air-bag device 10 is further provided with a rollover sensor 13 for detecting rollover of the vehicle. Note that FIGS. 1 and 2 are diagrams as viewed from the inside of the vehicle compartment. FIG. 1 shows the state where the air-bag body 16 is stored, and FIG. 2 shows the state where the air-bag body 16 is deployed. In those figures, the arrow FR indicates the forward direction of the vehicle, and the arrow UP indicates the upward direction of the vehicle.

Note that the side-impact sensor 12 is provided near the lower end of a center pillar (B-pillar) 18, and detects the side-collision state when a side-collision load equal to or higher than a predetermined value is applied to the side of the vehicle body. The rollover sensor 13 is provided near the tunnel portion of the floor. For example, a well-known roll angle velocity sensor for detecting a turning angle velocity by using the Coriolis force is used as the rollover sensor 13. This sensor outputs the average value of the rectified detection voltages to the control circuit 17 as a roll rate (RR). Note that an acceleration sensor or gas gyroscope for detecting the force produced for the predetermined mass according to the rotation about the longitudinal axis of the vehicle may be used as the rollover sensor 13.

The inflator 14 is provided near the joint portion between a front pillar (A-pillar) 20 and an instrument panel 22, and is connected to the control circuit 17. Accordingly, the inflator 14 is actuated by an output signal of the control circuit 17.

As shown in FIG. 2, the air-bag body 16 is deployed and inflated like a curtain along the side of the vehicle compartment so as to protect a head 50A of an occupant 50.

In the stored state shown in FIG. 1, the air-bag body 16 is folded in a predetermined folding manner into an elongate shape and contained in a resin case (not shown). The air-bag body 16 extends along the front pillar 20 and a roof side rail 28. More specifically, a front end 16A of the air-bag body 16 is located at the position of the inflator 14 so that the gas injected from the inflator 14 is introduced therein. An intermediate portion 16B of the air-bag body 16 is located along the front pillar 20 and the roof side rail 28, and a rear end 16C thereof is located near a quarter pillar (C-pillar) 30.

Figure 3:
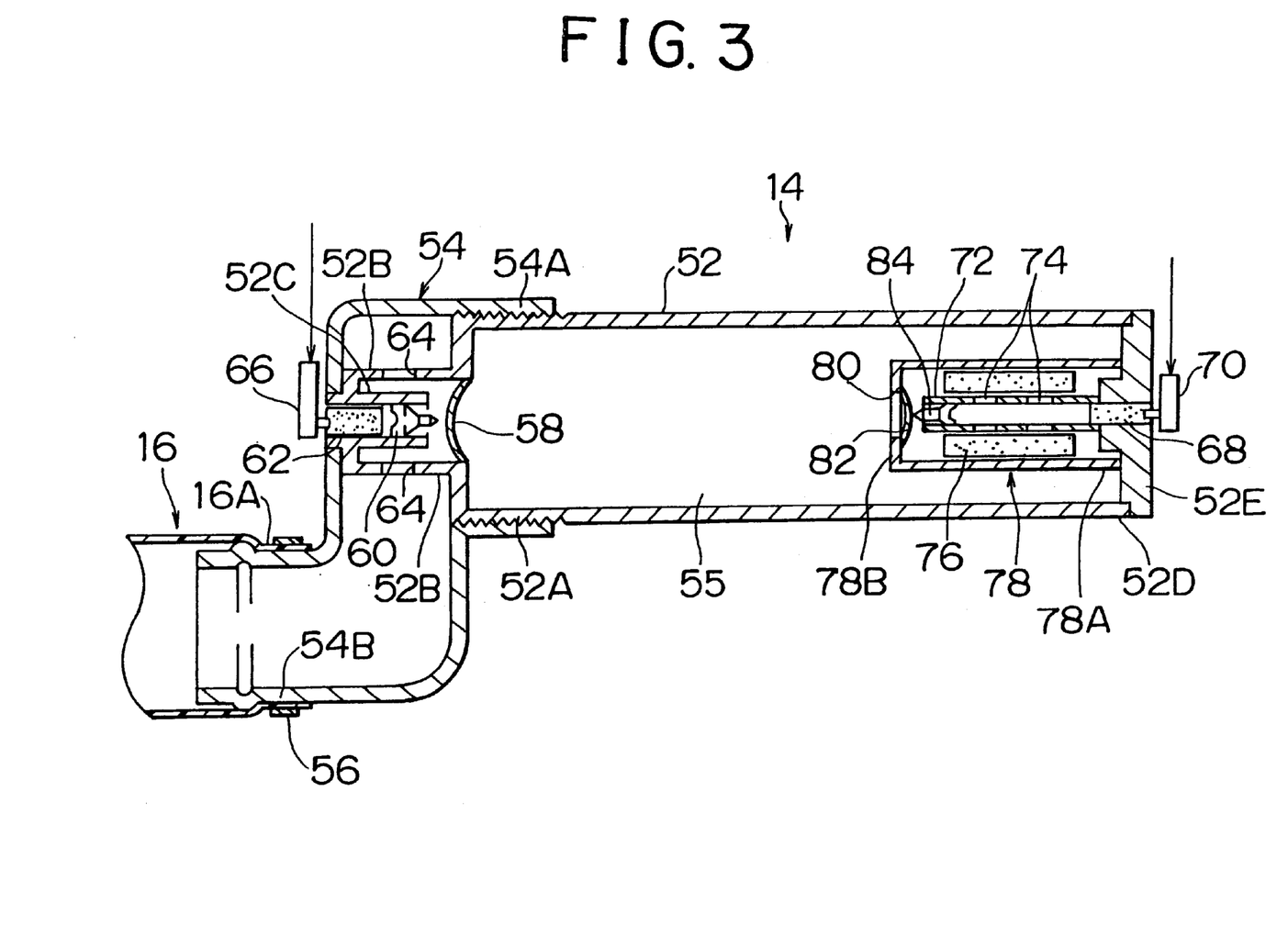
FIG. 3 is a sectional side elevation showing an inflator in a method for controlling deployment of an air-bag body of a head-protection air-bag device according to a first embodiment of the invention.
Figure 4:
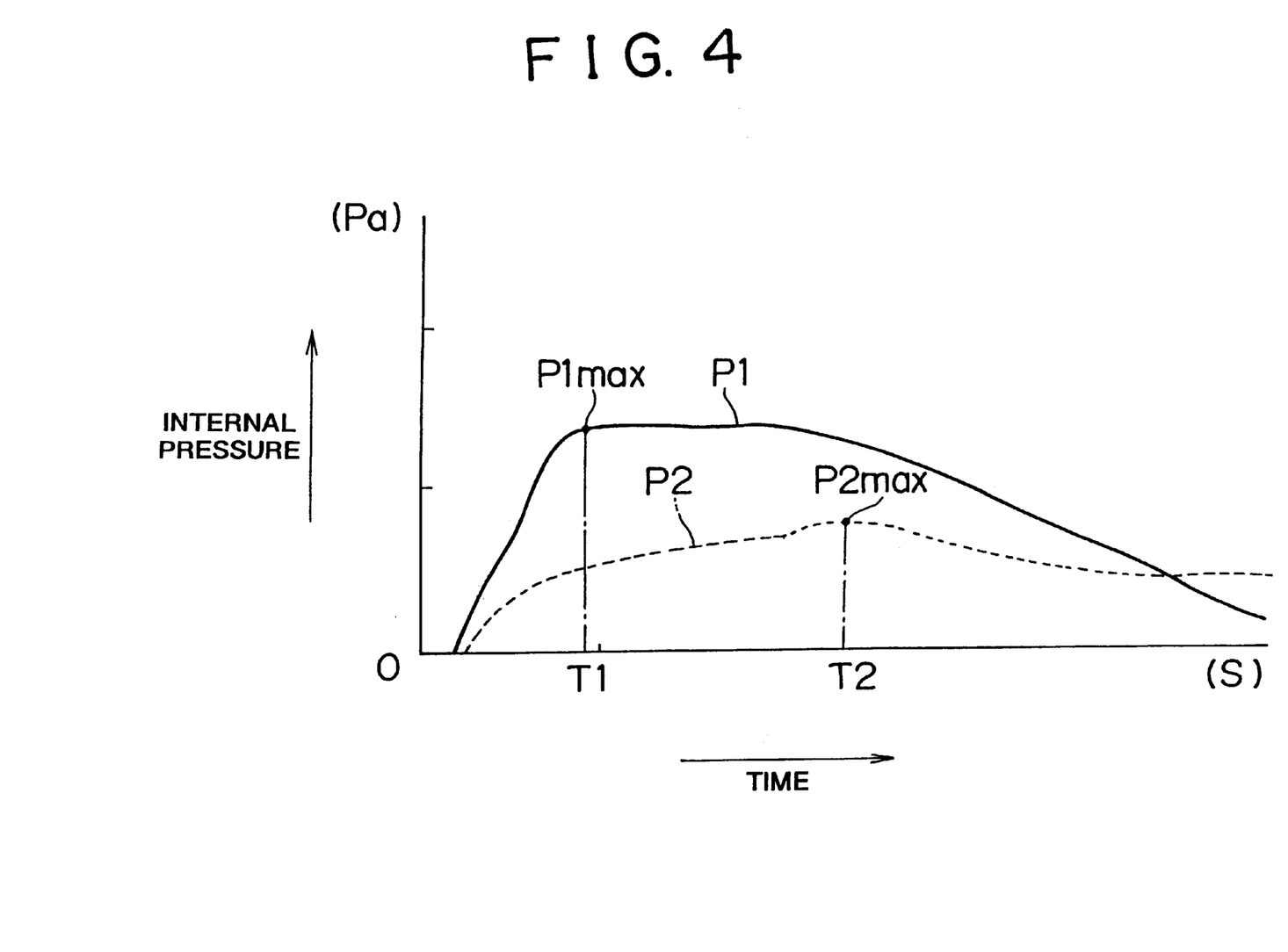
FIG. 4 is a graph showing a change in the internal pressure of the air-bag body in the method for controlling deployment of the air-bag body of the head-protection air-bag device according to the first embodiment of the invention.

As shown in FIG. 3, the inflator 14 includes a bottle 52 filled with a compressed gas 55, and one end 54A of a diffuser 54 is screwed onto the outer periphery of one end 52A of the bottle 52. The front end 16A of the air-bag body 16 is connected to the outer periphery of the other end 54B of the diffuser 54 by means of a clamp 56.

The bottle 52 has a small-diameter portion 52B projecting from the end 52A into the inside of the diffuser 54. A burst disk 58 separates the small-diameter portion 52B from the portion of the bottle 52 that is filled with the compressed gas 55. A launching pipe 52C is provided in the small-diameter portion 52B so as to face the burst disk 58. A firing pin 60 and a squib (igniter) 62 are provided in the launching pipe 52C. When the squib 62 is ignited, the firing pin 60 pierces through the burst disk 58, whereby the compressed gas 55 is injected into the small-diameter portion 52B. A plurality of through holes 64 each communicating with the diffuser 54 are formed in the outer periphery of the small-diameter portion 52B. The compressed gas 55 flows through the through holes 64 into the diffuser 54, and thus, into the air-bag body 16.

Note that the squib 62 is connected to the control circuit 17 through a connector 66, so as to be actuated based on the output signal of the control circuit 17.

The other end 52D of the bottle 52 is closed by a lid 52E, and a squib 68 is provided in the center of the lid 52E. The squib 68 is connected to the control circuit 17 through a connector 70, so as to be actuated based on the output signal of the control circuit 17.

A launching pipe 72 is fixed at the center of the lid 52E so as to be oriented into the bottle 52. A plurality of through holes 74 are formed in the periphery of the launching pipe 72. A gas-heating agent 76 is provided around the outer periphery of the launching pipe 72. The gas-heating agent 76 is contained in a case 78 having its one end 78A fixed to the lid 52E. The case 78 has an opening 80 at the other end, which is closed by a burst disk 82. A firing pin 84 is provided at the tip of the launching pipe 72 so as to face the burst disk 82.

When the squib 68 is ignited, the firing pin 84 pierces through the burst disk 82, so that the gas-heating agent 76 heats the compressed gas 55.

Hereinafter, effects of this embodiment will be described.

According to this embodiment, when the side-impact sensor 12 detects a side-collision state, both squibs 62 and 68 are actuated by the output of the control circuit 17. As a result, the firing pin 60 pierces through the burst disk 58 and the compressed gas 55 is ejected. Concurrently the firing pin 84 pierces through the burst disk 82, whereby the gas-heating agent 76 heats the compressed gas 55. Then the compressed gas 55 thus heated and pressurized by the gas-heating agent 76 flows through the through holes 64 of the small-diameter portion 52B and the diffuser 54 into the air-bag body 16. Therefore, in the case of the side collision, an internal pressure P1 of the air-bag body 16 quickly reaches the peak value (maximum value $P1_{max}$) at time T1, as shown by the solid line in FIG. 4. Thus, the air-bag body 16 is instantaneously deployed and inflated so as to protect the head 50A of the occupant 50.

When the rollover sensor 13 detects rollover of the vehicle, only the squib 62 is actuated by the output of the control circuit 17. Then the firing pin 60 pierces through the burst disk 58. Accordingly, the compressed gas 55 that is not heated and pressurized by the gas-heating agent 76 (which is referred to as "at a low pressure") flows through the through holes 64 of the small-diameter portion 52B and the diffuser 54 into the air-bag body 16. Accordingly, as shown by the dashed line in FIG. 4, in the case of the rollover, an internal pressure P2 of the air-bag body 16 has a lower peak value (maximum value $P2_{max}$) than that in the case of the side collision ($P1_{max} > P2_{max}$). Moreover, the internal pressure P2 reaches the peak value (maximum value $P2_{max}$) at time T2 that is longer than that in the case of the side collision (T2>T1). Accordingly, in the case of the rollover, the damage to the air-bag body 16 due to the gas pressure (i.e., weaving displacement and separation of the sealant) can be reduced. Moreover, since the compressed gas 55 is not heated by the gas-heating agent 76 and therefore has a low temperature, the heat damage to the air-bag body 16 can also be reduced.

Accordingly, in the case of the rollover, gas leakage resulting from the damage to the air-bag body 16 can be reduced, increasing the internal-pressure retention time. As a result, this makes it possible to allow the movement of the air-bag body 16 toward the outside of the vehicle while constraining the occupant 50 (in the deployed state) to be regulated for a longer time.

It is no longer necessary to increase the thickness of the sealant applied to the surface of the air-bag body 16 and the weaving density of the bag, in case of the rollover. Therefore, the bulk of the air-bag body in the folded state is not increased, and a large storage space is not necessary. Moreover, in the case of the rollover, the air-bag body 16 is deployed at a low expansion pressure. Therefore, the damage to the interior parts such as garnish and assist grip can be reduced, allowing reduction in the repair cost.

Note that, in this embodiment, only the squib 62 is actuated by the output of the control circuit 17 when the rollover sensor 13 detects rollover of the vehicle. Alternatively, as shown by the solid line P3 in FIG. 5, when the rollover sensor 13 detects rollover of the vehicle, the squib 62 may first be actuated (at time T3) and the squib 68 may also be actuated shortly thereafter (at time T4). In this case as well, the maximum value $P3_{max}$ of an internal pressure P3 of the air-bag body 16 may be smaller than the peak value of the internal pressure P1 in the side collision case (maximum value $P1_{max}$; see FIG. 4). Moreover, the internal pressure P3 can reach the peak value taking a longer time than that taken by the side collision case. Therefore, the same effects can be obtained.

Figure 5:
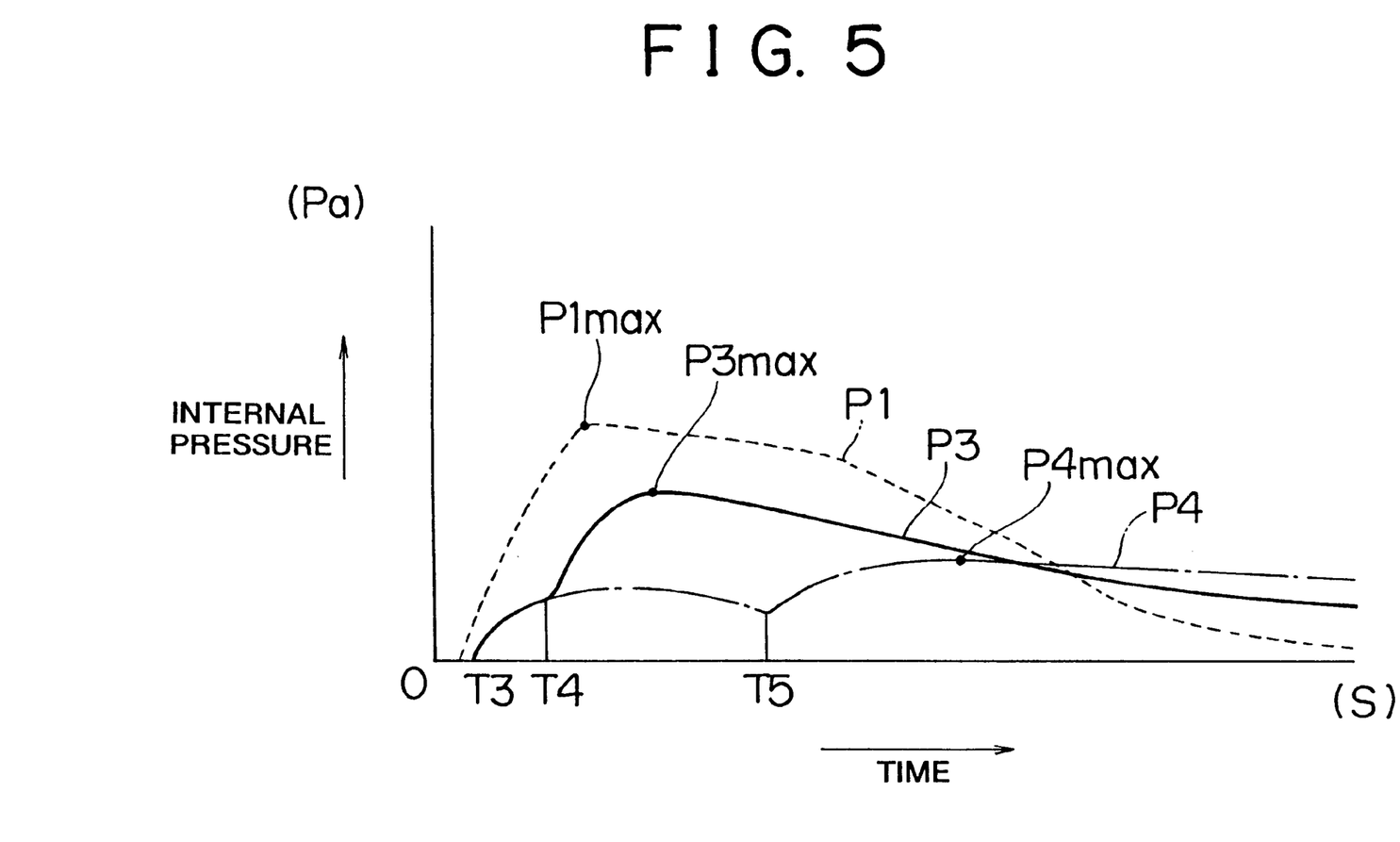
FIG. 5 is a graph showing a change in the internal pressure of an air-bag body in a method for controlling deployment of the air-bag body of a head-protection air-bag device according to a modification of the first embodiment of the invention.

As shown by the chain line P4 in FIG. 5, when the rollover sensor 13 detects rollover of the vehicle, the squib 62 may first be actuated (at time T3), and the squib 68 may then be actuated at the time interval longer than the time T4 (at time T5). In this case as well, the maximum value $P4_{max}$ of an internal pressure P4 of the air-bag body 16 may further be smaller than the maximum value of the internal pressure P1 in the side collision case ($P1_{max}$; see FIG. 4). The internal pressure P4 can reach the peak value, taking a longer time than that of the side collision case, thus providing the same effects.

Hereinafter, a method for controlling deployment of an air-bag body of a head-protection air-bag device according to a second embodiment of the invention will be described referring to FIG. 6.

Note that the same members as those of the first embodiment are denoted with the same reference numerals, and description thereof will be omitted.

Figure 6:
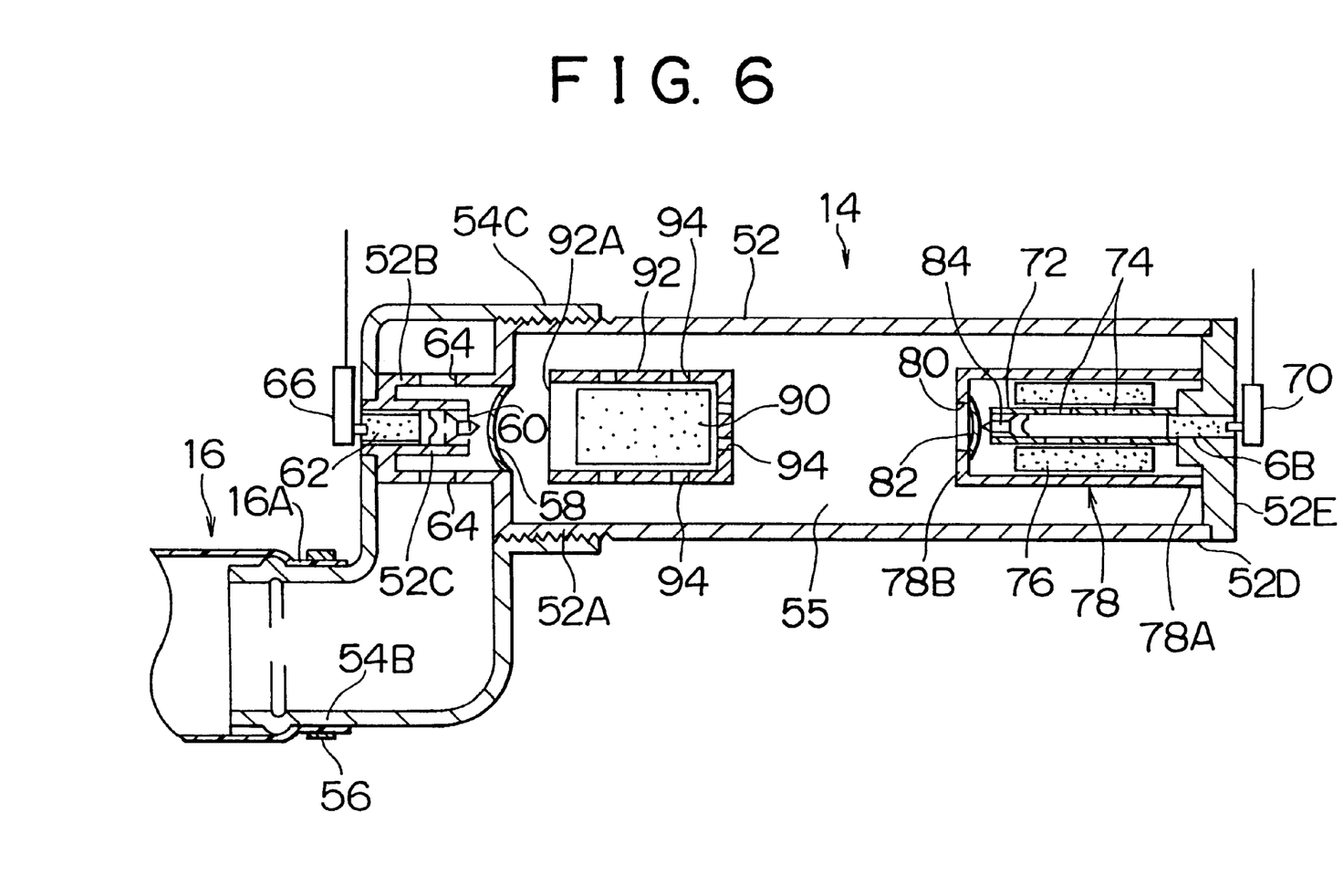
FIG. 6 is a sectional side elevation showing an inflator in a method for controlling deployment of the air-bag body of a head-protection air-bag device according to a second embodiment of the invention.

As shown in FIG. 6, in this embodiment, a heating agent 90 is provided within the bottle 52. The heating agent 90 is contained in a case 92. The case 92 has an opening 92A facing the burst disk 58, so that the firing pin 60 piercing through the burst disk 58 ignites the gas-heating agent 90. The case 92 has a plurality of through holes 94, whereby the gas-heating agent 90 heats the compressed gas 55 through the through holes 94.

Accordingly, in this embodiment, when the squib 62 is actuated, the firing pin 60 pierces through the burst disk 58 and ignites the gas-heating agent 90. Thus, the gas-heating agent 90 heats the compressed gas 55. As a result, in both cases of the side-collision and rollover, the internal pressure of the air-bag body 16 becomes slightly higher than that of the first embodiment, and also reaches the peak value for a shorter time than that of the case of the first embodiment. However, the relation between the respective internal pressures of the air-bag body upon side-collision and rollover is approximately the same as that shown in the graph of FIG. 4. Accordingly, in the second embodiment, the same effects as those of the first embodiment can be obtained.

The multi-stage-output inflator 14 having two-stage pressure characteristics is used in the above embodiments. However, a multi-stage-output inflator having three-stage pressure characteristics may alternatively be used. Moreover, it is also possible to combine a plurality of single-output inflators having single-stage pressure characteristics so as to actuate a plurality of inflators having the same output characteristics simultaneously or at intervals. Alternatively, it is possible to combine an inflator having output characteristics suitable for side collision and an inflator having output characteristics suitable for rollover.

Although the inflator 14 is provided near the joint portion between the front pillar 20 and the instrument panel 22 in the above embodiments, the inflator 14 may alternatively be provided at the quarter pillar 30, the roof side rail 28 or the center pillar 18. The inflator 14 may be provided at any two or all of the position near the joint portion between the front pillar 20 and the instrument pane 22, the position at the quarter pillar 30, the position at the roof side rail 28, and the position at the center pillar 18.

Figure 7:
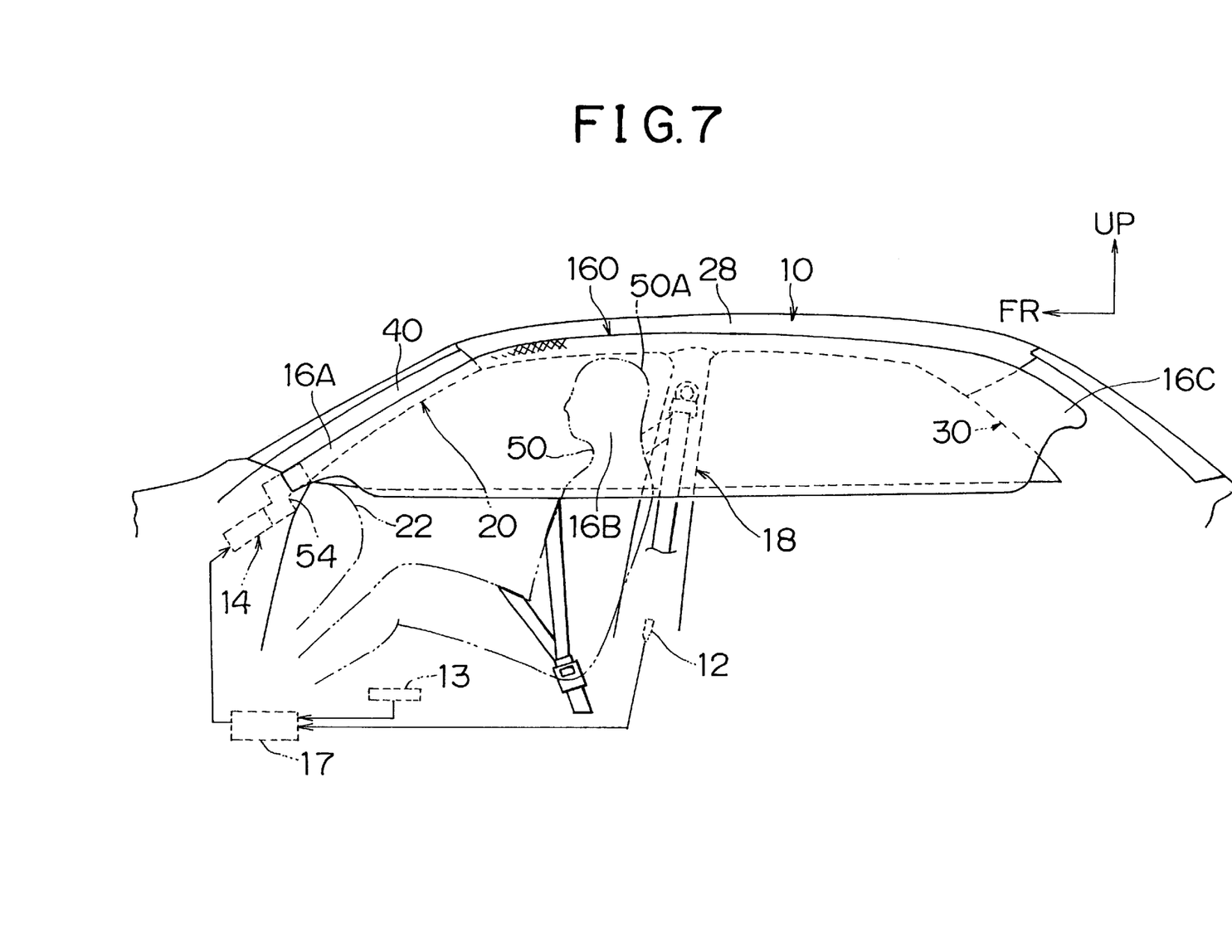
FIG. 7 is a schematic side view showing the state where an air-bag body is deployed in a method for controlling deployment of an air-bag body of a head-protection air-bag device according to another embodiment of the invention.

The method for controlling deployment of an air-bag body of a head-protection air-bag device according to the invention is not limited to the airbag body 16 having the shape shown in FIG. 2. The invention can also be applied to an air-bag body 160 having such a shape that protects the heads of the occupants in the front and rear seats, as shown in FIG. 7, and to an air-bag body having another shape.

Hereinafter, a method for controlling deployment of an air-bag body of a head-protection air-bag device according to a third embodiment of the invention will be described referring to FIG. 8.

Note that the same members as those of the first embodiment are denoted with the same reference numerals, and description thereof will be omitted.

Figure 8:
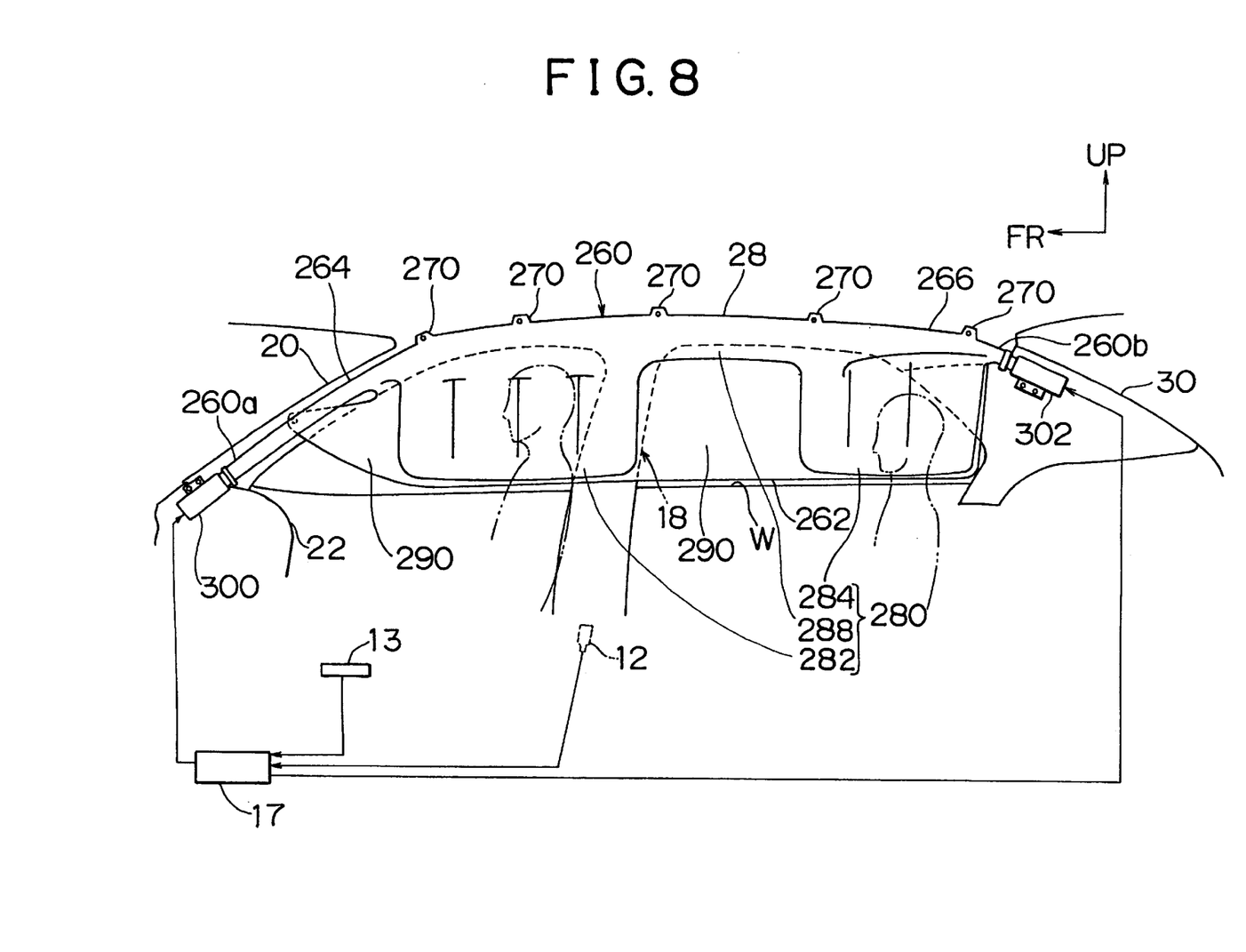
FIG. 8 is a schematic side view showing the state where an air-bag body is deployed in a method for controlling deployment of an air-bag body of a head-protection air-bag device according to a third embodiment of the invention.

As shown in FIG. 8, an air-bag body 260 of this embodiment is shaped to protect the heads of the occupants in the front and rear seats. The air-bag body 260 is folded in a predetermined folding manner and stored along the front pillar 20, roof side rail 28 and quarter pillar 30 which are located along the peripheral edge of the upper end of an opening W of the doors and windows in the vehicle compartment. The air-bag body 260, whose deployed state is shown in FIG. 8, is provided with a body portion 262 covering the opening W, front and rear gas-introducing portions 264 and 266 for introducing an inflation gas from an inflator into the body portion, and attachment portions 270 provided at the upper edge of the body portion 262.

The body portion 262 is provided with an inflating portion 280 communicating with the front gas-introducing portion 264 and rear gas-introducing portion 266 so as to be inflated with the inflation gas introduced therein, and a non-inflating portion 290 that does not allow the inflation gas to be introduced therein. The inflating portion 280 is comprised of a front inflating portion 282 capable of being located on the front-seat side of the vehicle, a rear inflating portion 284 capable of being located at the rear-seat side of the vehicle, and a communicating inflating portion 288 causing the front gas-introducing portion 264 and front inflating portion 282 to communicate with each other, and also causing the rear gas-introducing portion 266 and rear inflating portion 284 to communicate with each other.

The front inflating portion 282 has a capacity that is larger than that of the rear inflating portion 284.

The inflator of this embodiment is comprised of a front inflator 300 provided near the joint portion between the front pillar 20 and instrument panel 22, and a rear inflator 302 provided at the quarter pillar 30. The front inflator 300 and rear inflator 302 are each connected to the control circuit 17. The front inflator 300 and rear inflator 302 can be independently actuated by an output signal of the control circuit 17.

The front inflator 300 is connected to a front end 260a of the air-bag body, and the gas injected from the front inflator 300 flows into the air-bag body from the front end 260a toward the rear of the vehicle. On the other hand, the rear inflator 302 is connected to a rear end 260b of the air-bag body, and the gas injected from the rear inflator 302 flows into the air-bag body from the rear end 260b toward the front of the vehicle. Since the capacity of the front inflating chamber 282 is larger than that of the rear inflating chamber 284, the output of the front inflator 300 is set to be larger than that of the rear inflator 302.

Hereinafter, effects of this embodiment will be described.

In this embodiment, when the side-impact sensor 12 detects a side collision state, both front inflator 300 and rear inflator 302 are actuated by the output of the control circuit 17. As a result, a high pressure gas from the front inflator 300 flows into the air-bag body from the front end 260a, as well as a low pressure gas from the rear inflator 302 flows into the air-bag body from the rear end 260b. Therefore, the air-bag body 260 is instantaneously deployed and inflated, thereby protecting the heads of the occupants seated in the front and rear seats.

On the other hand, when the rollover sensor 13 detects rollover of the vehicle, only the front inflator 300 is actuated by the output of the control circuit 17. As a result, the high pressure gas from the front inflator 300 flows into the air-bag body from the front end 260a. Accordingly, in the case of the rollover, the internal pressure of the air-bag body 260 has a lower peak value than in the case of the side collision, as well as the increase rate of the internal pressure is reduced. Therefore, in the case of the rollover, the damage to the air-bag body 260 due to the gas pressure (i.e., weaving displacement, separation of the sealant, or the like) can be reduced.

Accordingly, in the case of the rollover, gas leakage resulting from the damage to the air-bag body 260 can be reduced, increasing the internal pressure retention time. This makes it possible to allow the movement of the air-bag body 260 toward the outside of the vehicle while constraining the occupants (in the deployed state) to be regulated for a longer time.

As a result, it is no longer necessary to increase the thickness of the sealant applied to the surface of the air-bag body 260 and the weaving density of the bag, in case of the rollover. Therefore, the bulk of the air-bag body 260 in the folded state is not increased, and a large storage space is not necessary.

Moreover, in the case of the rollover, the air-bag body 260 is deployed at a low expansion pressure. Therefore, the damage to the interior parts such as garnish and assist grip can be reduced, allowing reduction in the repair cost.

Note that, in this embodiment, only the front inflator 300 is actuated by the output of the control circuit 17 when the rollover sensor 13 detects rollover of the vehicle. Alternatively, when the rollover sensor 13 detects rollover of the vehicle, the front inflator 300 may first be actuated and the rear inflator 302 may be actuated at a predetermined time interval thereafter. In this case as well, the peak value of the internal pressure of the air-bag body 260 can be reduced, and also, the time for the internal pressure of the air-bag body 260 to reach the peak value can be increased. Therefore, the same effects as those described above can be obtained. The order of actuating the front inflator 300 and rear inflator 302 may be modified such that the rear inflator 302 is first actuated and the front inflator 300 is actuated at a predetermined time interval thereafter. In this case as well, the same effects as those described above can be obtained.

Figure 9:
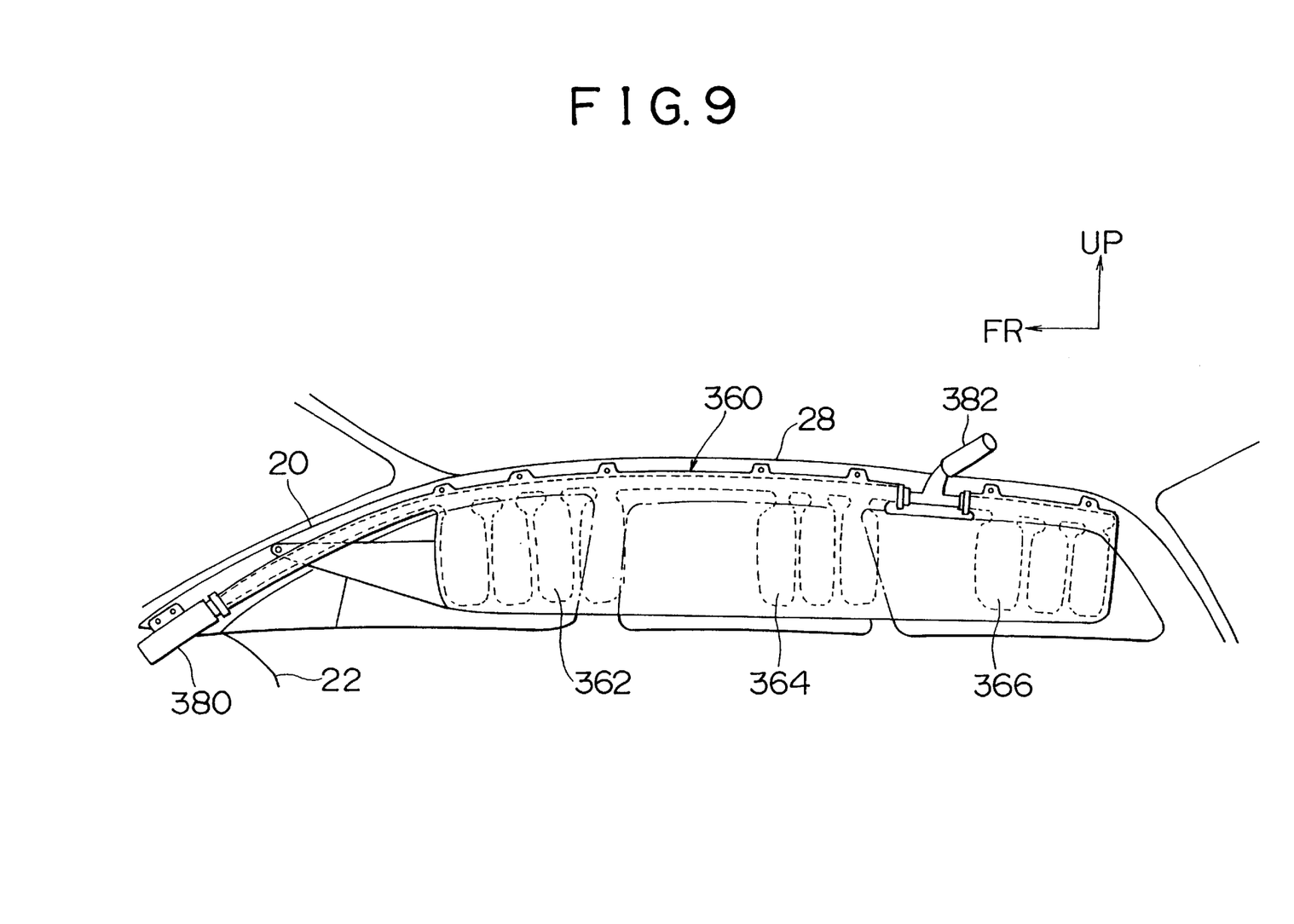
FIG. 9 is a schematic side view showing the state where an air-bag body is deployed in a method for controlling deployment of an air-bag body of a head-protection air-bag device according to another embodiment of the invention.

Each of the above embodiments can also be applied to a vehicle provided with the front seat, second-row seat, and third-row seat as shown in FIG. 9. In this case, an air-bag body 360 is provided with a front inflating portion 362, a middle inflating portion 364, and a rear inflating portion 366. The inflator may be comprised of a front inflator 380 provided near the joint portion between the front pillar 20 and instrument panel 22, and a rear inflator 382 provided near the roof side rail 28 so as to be connected between the middle inflating portion 364 and rear inflating portion 366 of the air-bag body. The front inflator 380 injects the gas into the front inflating portion 362, and the rear inflator 382 injects the gas into the middle and rear inflating portions 364 and 366. Therefore, the capacity of the rear inflator 382 is set to be larger than that of the front inflator 380.

In the aforementioned vehicle, when the side collision state is detected, both front inflator 380 and rear inflator 382 are actuated. On the other hand, when the rollover is detected, one of the front inflator 380 and rear inflator 382 may be actuated. Alternatively, when the rollover of the vehicle is detected, any deployment method may be used such as: the front inflator 380 is first actuated and the rear inflator 382 is actuated at a predetermined time interval thereafter; or the rear inflator 382 is first actuated and the front inflator 380 is actuated at a predetermined time interval thereafter. In this case as well, the same effects as those of the above embodiments can be obtained.

Note that the present invention is not limited to this, and a multi-stage-output inflator having pressure characteristics of a plurality of stages may be used. It is also possible to combine a plurality of single-output inflators or to combine a multi-stage-output inflator and a single-output inflator.

In the foregoing description, specific embodiments of the invention are explained in detail. However, it should be appreciated by those skilled in the art that the invention is not limited to such embodiments, and various other embodiments are possible within the scope of the invention.

What is claimed is:

1. A method for controlling deployment of an air-bag body of a head-protection air-bag device, said method comprising:

providing the air-bag along a side of a vehicle compartment, the air-bag body being deployable and inflatable by a gas injected from at least one inflator actuated in response to a detection signal; and injecting gas from the at least one inflator at one of a first pressure and a second pressure that is lower than the first pressure, wherein the first pressure is provided when said detection signal is a side collision signal, and the second pressure is provided when said detection signal is a rollover signal.

2. The method for controlling deployment of an air-bag body according to claim 1, wherein a time for an internal pressure of the air-bag body to reach a peak value by the injected gas from the at least one inflator when rollover is detected is larger than a time for an internal pressure of the air-bag body to reach a peak value by the injected gas from the at least one inflator when side collision is detected.

3. The method for controlling deployment of an air-bag body according to claim 1, wherein the at least one inflator is capable of changing the pressure of the gas injected therefrom in multiple stages.

4. The method for controlling deployment of an air-bag body according to claim 3, further comprising:

providing the inflator with a portion filled with a compressed gas and a heater for hearing the compressed gas, wherein the inflation by the inflator actuates the heater to inject the compressed gas when side collision is detected, and wherein the inflation by the inflator injects the compressed gas without actuating the heater when rollover is detected.

5. The method for controlling deployment of an air-bag body according to claim 1, further comprising:

providing the head-protection air-bag device with a plurality of inflators, wherein a number of inflators to be actuated when side collision is detected is more than the number of inflators to be actuated when rollover is detected.

6. The method for controlling deployment of an air-bag body according to claim 5, wherein the plurality of inflators have different output characteristics from each other.

7. The method for controlling deployment of an air-bag body according to claim 1, wherein the air-bag body is shaped to protect heads of occupants in front and rear seats of a vehicle.

8. The method for controlling deployment of an air-bag body according to claim 7, wherein the inflator is comprised of a front inflator for injecting a gas into the air-bag body from front of the vehicle and a rear inflator for injecting a gas into the air-bag body from rear of the vehicle, and wherein an output of the front inflator is set to be higher than that of the rear inflator.

9. The method for controlling deployment of an air-bag body according to claim 8, wherein the front and rear inflators are substantially simultaneously actuated when the side collision is detected, and wherein only one of the front inflator and the rear inflator is actuated when the rollover is detected.

10. The method for controlling deployment of an air-bag body according to claim 1, wherein the air-bag body is shaped to protect heads of occupants in front, second-row and third-row seats of a vehicle.

11. The method for controlling deployment of an air-bag body according to claim 1, wherein the side collision signal is detected by a side collision sensor and the rollover signal is detected by a rollover sensor.

12. A method for controlling deployment of an air-bag body of a head-protection air-bag device, said method comprising:

provided the air-bag body along a side of a vehicle compartment, the air-bag body being deployable and inflatable by a gas injected from at least one inflator actuated in response to a detection signal;

providing a first time and a second time that is more than the first time for an internal pressure of the air-bag body to reach a peak-value by the injected gas from the at least one inflator, wherein the first time is provided when the detection signal is a side collision signal and the second time is provided when the detection signal is a rollover signal.

13. The method for controlling deployment of an air-bag body according to claim 12, wherein the at least one inflator is capable of changing a time for a pressure of the gas injected from the at least one inflator to reach a peak value.

14. The method for controlling deployment of an air-bag body according to claim 12, further comprising:

providing the inflator with a portion filled with a compressed gas and a heater for heating the compressed gas, wherein the inflation by the inflator actuates the heater simultaneously with starting injection of the compressed gas when side collision is detected, and wherein the inflation by the inflator actuates the heater at a predetermined time interval from starting injection of the compressed gas when rollover is detected.

15. The method for controlling deployment of an air-bag body according to claim 12, further comprising:

providing the head-protection air-bag device with a plurality of inflators.

wherein at least one of the plurality of inflators is actuated at a timing different from that of the remainder of the inflators when rollover is detected.

16. The method for controlling deployment of an air-bag body according to claim 15, further comprising:

providing the head-protection air-bag device with a plurality of inflators, wherein first and second inflators are simultaneously actuated when side collision is detected, and wherein the second inflator is actuated at a predetermined time interval from actuation of the first inflator when rollover is detected.

17. The method for controlling deployment of an air-bag body according to claim 16, wherein the first and second inflators have different output characteristics from each other.

18. The method for controlling deployment of an air-bag body according to claim 12, wherein the air-bag body is shaped to protect heads of occupants in front and rear seats of a vehicle.

19. The method for controlling deployment of an air-bag body according to claim 18, wherein the inflator is comprised of a front inflator for injecting a gas into the air-bag body from front of the vehicle and a rear inflator for injecting a gas into the air-bag body from rear of the vehicle, and wherein an output of the front inflator is set to be higher than that of the rear inflator.

20. The method for controlling deployment of an air-bag body according to claim 19, wherein the front and rear inflators are substantially simultaneously actuated when the side collision is detected, and wherein the other of the front and rear inflators is actuated at a predetermined time interval from actuation of one of the front and rear inflators when the rollover is detected.

21. The method for controlling deployment of an air-bag body according to claim 12, wherein the air-bag body is shaped to protect heads of occupants in front, second-row and third-row seats of a vehicle.

22. The method for controlling deployment of an air-bag body according to claim 12, wherein the side collision signal is detected by a side collision sensor and the rollover signal is detected by a rollover sensor.

23. A head-protection air-bag device having an air-bag body, comprising:

at least one inflator for holding gas and that injects gas to the air-bag body;

a side-collision sensor that detects side collision of the vehicle;

a rollover sensor that detects rollover of the vehicle; and a control circuit operatively connected to the at least one inflator and the side-collision sensor for causing the at least one inflator to inject gas at of a first pressure or a second pressure lower than the first pressure from the inflator, wherein the first pressure is provided when the side-collision sensor detects a side collision, and wherein the second pressure is provided when the rollover sensor detects a rollover.

24. A head-protection air-bag device having an air-bag body, comprising:

at least one inflator for holding gas and that injects gas to the air-bag body;

a side-collision sensor that detects side collision of the vehicle;

a rollover sensor that detects rollover of the vehicle; and a control circuit operatively connected to the at least one inflator, the side-collision sensor and the rollover sensor, wherein a first time for an internal pressure of the air-bag body to reach a peak value by the injected gas from the at least one inflator when the side-collision sensor detects side collision is less than a second time for an internal pressure of the air-bag body to reach a peak value by the injected gas from the at least one inflator when the rollover sensor detects rollover.

* * * * *